US006471384B1

(12) United States Patent
Ito

(10) Patent No.: US 6,471,384 B1
(45) Date of Patent: Oct. 29, 2002

(54) VEHICLE HEADLAMP

(75) Inventor: Takaya Ito, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/438,455

(22) Filed: Nov. 12, 1999

(30) Foreign Application Priority Data

Nov. 16, 1998 (JP) .......................................... 10-324685

(51) Int. Cl.[7] .................................................. B60Q 1/02
(52) U.S. Cl. ........................ 362/518; 362/547; 362/539
(58) Field of Search ................................. 362/517, 518, 362/297, 346, 351, 547, 539, 509

(56) References Cited

U.S. PATENT DOCUMENTS 5,611,612 A 3/1997 Choji et al.
5,782,550 A * 7/1998 Ohashi ....................... 362/351
5,971,575 A * 10/1999 Matubara .................... 362/510
5,993,035 A * 11/1999 May et al. .................. 362/547
6,079,860 A * 6/2000 Ito ............................ 362/509
6,109,773 A * 8/2000 Nace .......................... 362/548
6,132,068 A * 10/2000 Katsumata .................. 362/539
6,176,604 B1 * 1/2001 Dubrovin et al. ........... 362/539

* cited by examiner

*Primary Examiner*—Thomas M. Sember
(74) *Attorney, Agent, or Firm*—Fish & Richardson P.C.

(57) ABSTRACT

A vehicle headlamp with a shade whose vibration resistance strength can be sufficiently secured on keeping the appearance of lamp fixture from being deteriorated. A fitting-stay fixing portion (28) for fixing a fitting stay (26) of a shade (22) is provided at the back of a reflective surface (**20*a*) of a reflector (20). Thus, the structure of the fitting-stay fixing portion (28) is prevented from being seen when the lamp fixture is seen from its front side. A reflective region (20*a*1) positioned at the front of the fitting-stay fixing portion (28) of the reflective surface (20*a*) is so formed as to project forward relative to reflective regions (20*a*2) adjacent to the reflective region (20*a*1) at the front of the fitting-stay fixing portion, whereby the position of arranging the fitting-stay fixing portion (28) can be set close to the center of gravity of the shade (22). Therefore, the inertia of moment of the shade (22) can be lowered by decreasing the length of the lever of the fitting stay (26**).

6 Claims, 5 Drawing Sheets

VEHICLE HEADLAMP

BACKGROUND OF THE INVENTION

This invention relates to a vehicle headlamp with a shade.

Many vehicle headlamps are often fitted with shades for shielding the direct light directed forward from light source bulbs in order to avoid causing oncoming vehicle drivers and pedestrians to be blinded by the glare of headlamps.

As shown in FIG. 5A, a conventional shade 2 includes a shielding cap 2*a* and a fitting stay 2*b* extending from the shielding cap 2*a* and fixed to a reflector 6.

With respect to the aforementioned conventional shade 2, the fitting stay 2*b* is fixed to the reflective surface 6*a* of the reflector 6 with a screw. Consequently, the screw 8 of a fitting-stay fixing portion 6*b* becomes apparent when the lamp fixture is seen from its front side and the problem is that the appearance of the lamp fixture would be impaired.

On the other hand, the screw 8 is prevented from being seen when the lamp fixture is seen from its front side on condition that the fitting-stay fixing portion 6*b* is provided at the back of the reflective surface 6*a* of the reflector 6 as shown in FIG. 5B.

However, the lever of the cantilevered fitting stay 2*b* tends to become longer in this case and this makes greater the inertia of moment of the shade 2. Accordingly, it is difficult to secure sufficient strength to vehicle vibrations and the like.

SUMMARY OF THE INVENTION

It is therefore an object of the present invention made in view of the aforementioned situation to provide a vehicle headlamp which is fitted with a shade whose vibration resistance strength can be sufficiently secured on keeping the appearance of lamp fixture from being deteriorated.

The present invention is intended to accomplish the object above by contriving to provide an improved fitting-stay fixing portion for a reflector.

A vehicle headlamp according to the present invention comprises a light source bulb, a reflector having a reflective surface for reflecting light from the light source bulb forward, and a shade for shielding the direct light directed forward from the light source bulb and is characterized in that: the shade includes a shielding cap and a fitting stay extending from the shielding cap and fixed to the reflector; a fitting-stay fixing portion of the reflector is provided at the back of the reflective surface; and a reflective region positioned at the front of the fitting-stay fixing portion of the reflective surface is so formed as to project forward relative to reflective regions adjacent to the reflective region at the front of the fitting-stay fixing portion.

The aforementioned 'fitting stay' may be formed integrally with or separately from the shielding cap.

A method of fixing the shade to the 'fitting-stay fixing portion' of the reflector is not particularly restrictive but may be such that the fitting stay is fixed to the reflective surface by tightening a screw or using a lance, for example.

As shown in the arrangement above, according to the present invention, the structure of the fitting-stay fixing portion is prevented from being seen when the lamp fixture is seen from its front side as the fitting-stay fixing portion of the reflector is provided at the back of the reflective surface. According to the present invention, moreover, the position of arranging the fitting-stay fixing portion can be set close to the center of gravity of the shade since the reflective region positioned at the front of the fitting-stay fixing portion of the reflective surface is so formed as to project forward relative to reflective regions adjacent to the reflective region at the front of the fitting-stay fixing portion. Therefore, the movement of inertia of the shade can be lowered by decreasing the length of the lever of the fitting stay, whereupon the vibration resistance strength can be sufficiently secured.

In the vehicle headlamp fitted with the shade according to the present invention, the vibration resistance strength of the shade can thus be sufficiently secured on keeping the appearance of the lamp fixture from being deteriorated.

The aforementioned 'reflective surface' may be formed with a single curved surface such as a rotary parabolic surface. As described above, however, the reflective surface may comprise a plurality of reflective elements which are divided segments having predetermined shapes. In the case of the latter, by setting the reflective region at the front of the fixing portion substantially similar in shape to each of the segments of the reflective elements forming the reflective regions adjacent to a reflective region at the front of the fixing portion, the reflective region at the front of the fixing portion can be harmonized with the other regions of the reflective surface in view of designing-making, so that the appearance of the lamp fixture as seen from its front side is improved.

In order to extend the fitting stay up to the back side of the reflective surface, the fitting-stay inserting portion may be formed by cutting the bulb inserting hole of the reflector wider. As described above, however, by forming a fitting-stay inserting hole for use in inserting the fitting stay from above in the reflector, the fitting-stay fixing portion can be provided in any desired position while the cutout area of the reflector is minimized. In this case, the aforementioned 'fitting stay' is formable so that it may extend downward directly from the shielding cap or otherwise it may be bent into a substantially L-shape in that it is first extended downward after being extended backward from the shielding cap.

In a case where reflectors differ in configuration from lateral lamp fixtures (i.e. right side and left side), shielding caps of shades different in configuration are often set to lateral lamp fixtures, respectively. In this case, forming an erroneous installation preventive portion in the leading end portion of the fitting stay prevents a shade of different specification from being fitted to the reflector.

DETAILED DESCRIPTION OF THE DRAWINGS

An embodiment of the invention will now be described with reference to the drawings.

Figure 1:
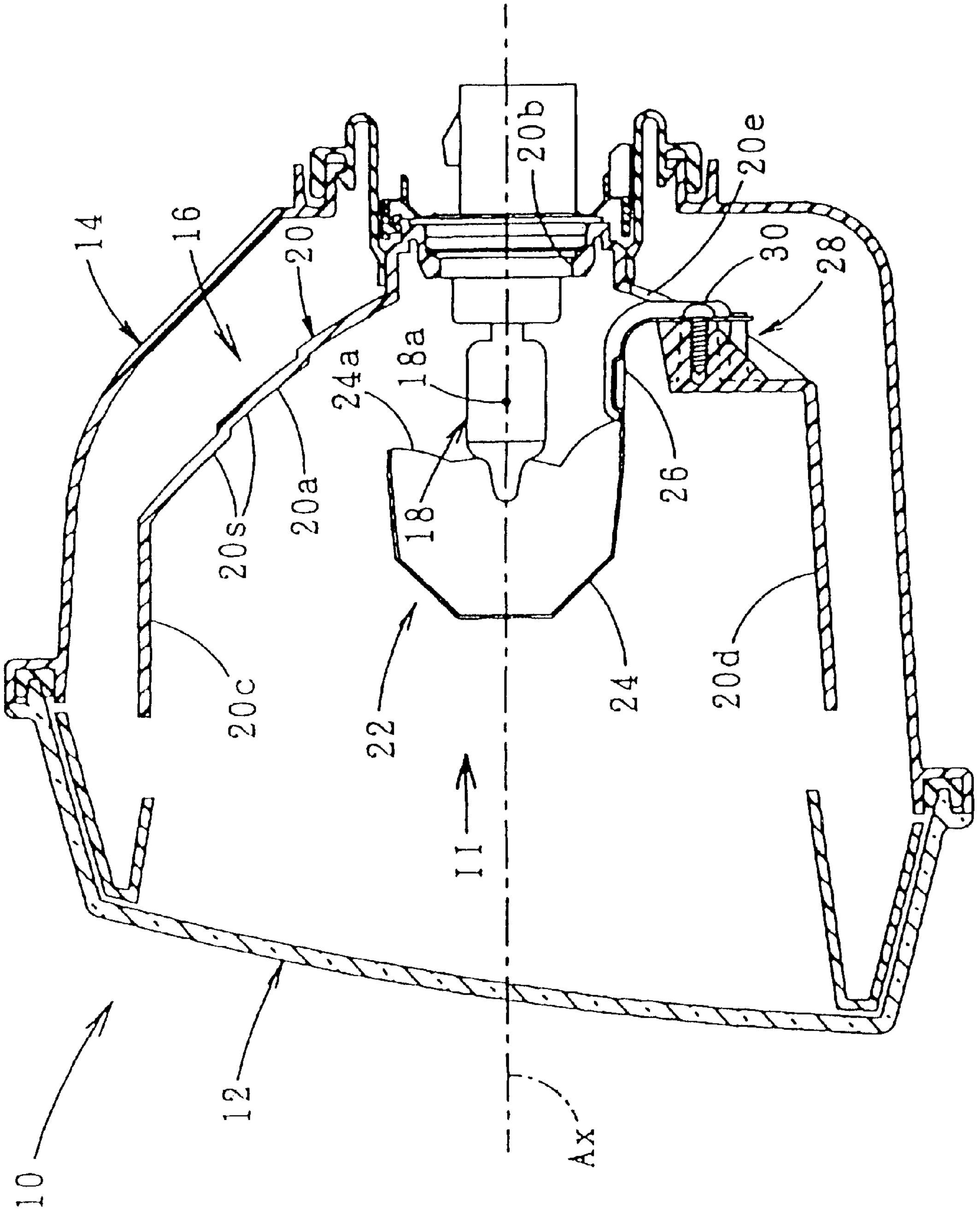
FIG. 1 is a sectional side view of a vehicle headlamp embodying the present invention.
Figure 2:
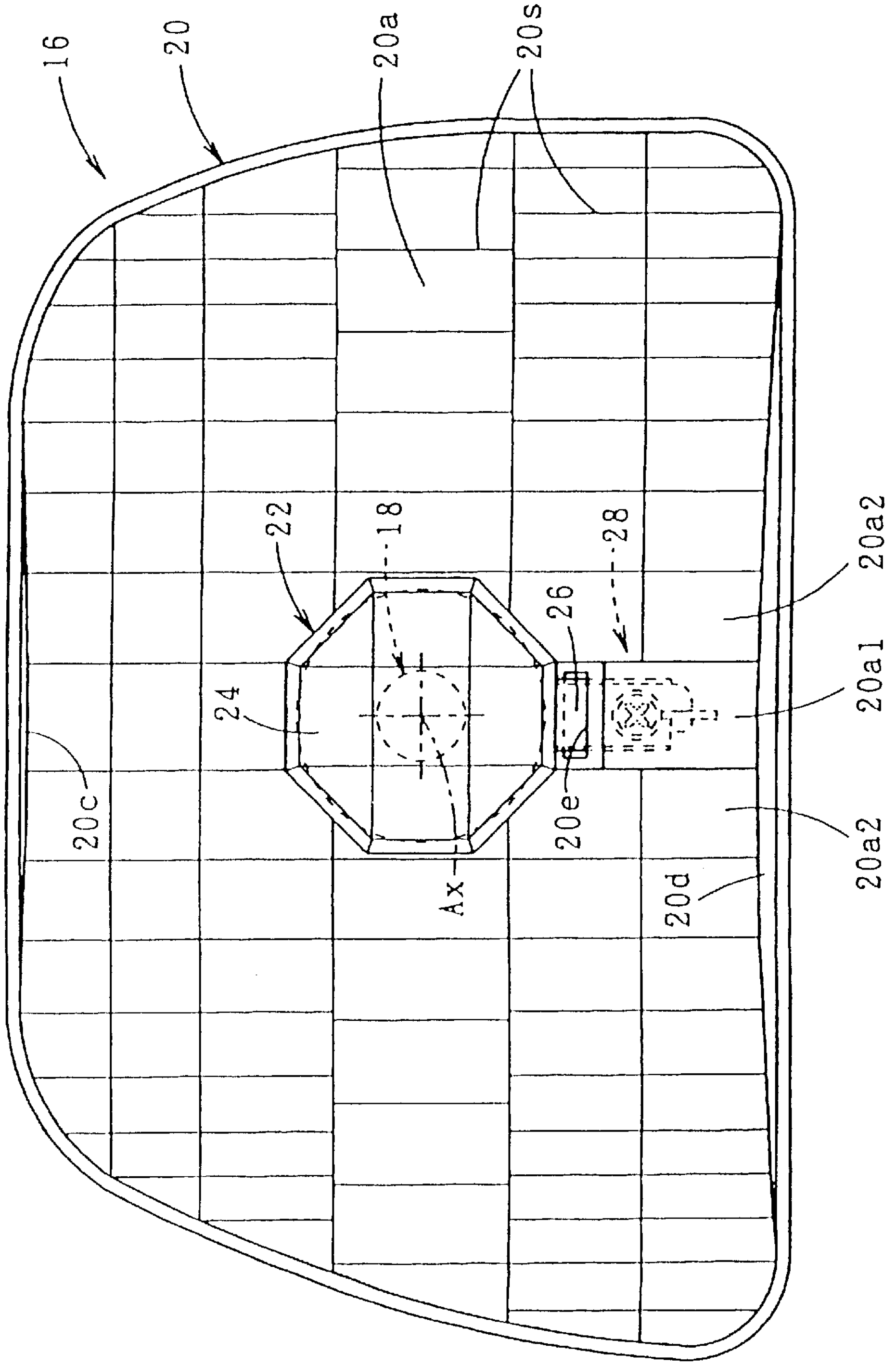
FIG. 2 is a bottom view taken in the direction of an arrow II of FIG. 1 illustrating a single shade according to the above-described embodiment.

FIG. 1 is a sectional side view of a vehicle headlamp embodying the present invention; and FIG. 2, a view taken in the direction of an arrow II of FIG. 1.

As shown in FIGS. 1 and 2, this vehicle headlamp 10 includes a lens 12 and a lamp body 14 that form a lamp chamber in which a reflector unit 16 is provided to be adjustable its tilt in vertical and horizontal directions.

The reflector unit 16 includes a light source bulb 18, a reflector 20 and a shade 22.

The light source bulb 18 is a halogen bulb of a so-called HB1 (9004) type and securely inserted into a bulb inserting hole 20*b* in the rear top portion of the reflector 20 so that a low-beam filament 18*a* may be positioned on the optical axis Ax of the reflector 20.

The reflector 20 has a reflective surface 20*a* that is formed from a plurality of reflective elements 20*s* on a rotary parabolic surface with the optical axis Ax as a center axis. Consequently, light from the light source bulb 18 is diffused, deflected and reflected forward by the reflective surface 20*a*. The plurality of reflective elements 20*s* are divided rectangular segments each of which is longer than is wide. In the upper and lower areas of the reflective surface 20*a*, the segments are formed so that the lateral width of each segment may be gradually decreased toward both the lateral side portions from the optical axis Ax.

The shade 22 includes a shielding cap 24 in the form of a polygon and a fitting stay 26 extended from the rear edge of the lower end portion of the shielding cap 24 and fixed to the reflector 20.

The shielding cap 24 is used for shielding the direct light that is not only emitted from the light source bulb 18 in the forward direction of the lamp fixture but also incident on both the vertical wall surfaces 20*c* and 20*d* of the reflector 20. The reflector 20 is such that the profile of its reflective surface 20*a* is laterally asymmetrical with respect to the optical axis Ax. Accordingly, the profile of the rear end edge 24*a* of the shielding cap 24 is also laterally asymmetrical with respect to the optical axis Ax.

The fitting stay 26 is formed integrally with the shielding cap 24 and bent into a substantially L-shape so that it may be extended downward after being extended backward from the rear edge of the lower end portion of the shielding cap 24.

A fitting-stay fixing portion 28 for fixing the fitting stay to the reflector 20 is provided at the back of the reflective surface 20*a* and the specific arrangement therefor will be described hereinafter.

Figure 3:
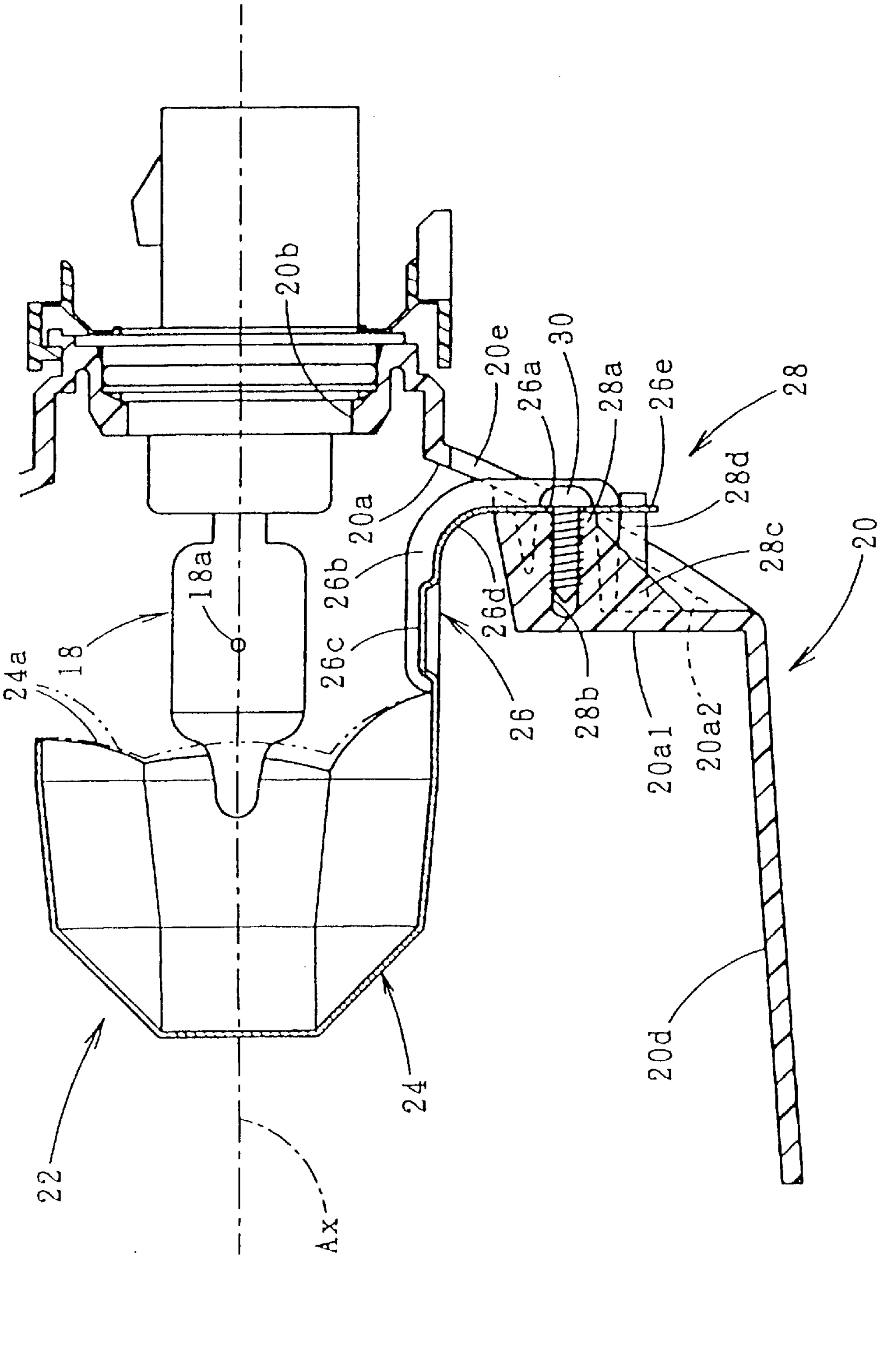
FIG. 3 is a detailed drawing of the principal part of FIG. 1.
Figure 4B:
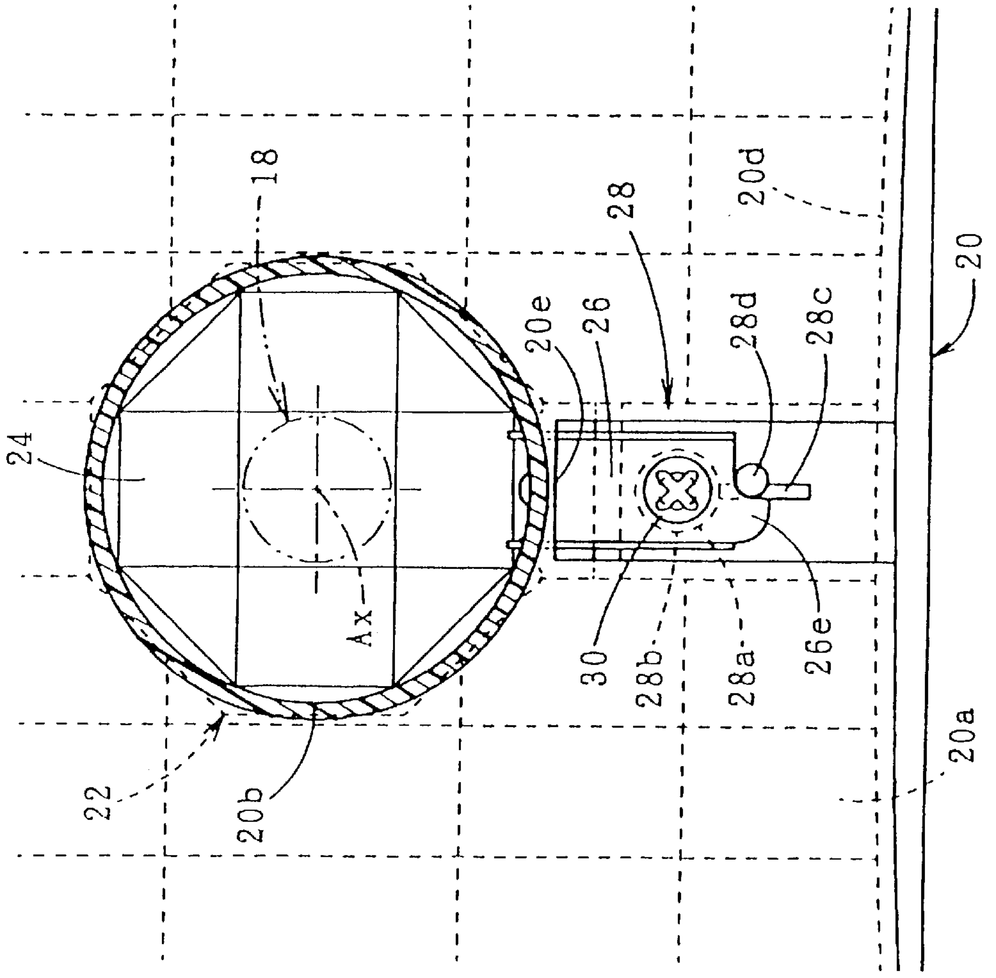
FIG. 4B is a rear elevation of a fitting-stay fixing portion to which the shade is fitted.
Figure 4A:
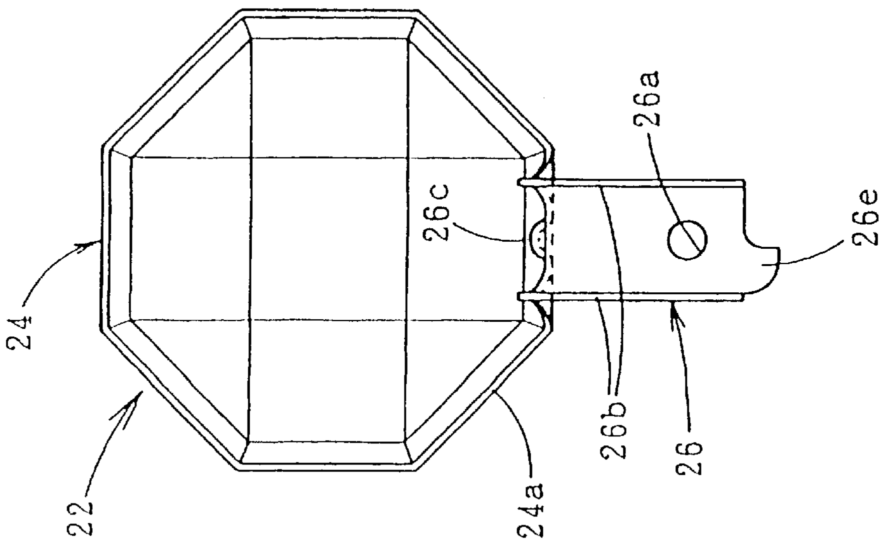
FIG. 4A is a rear elevation of a single shade.
Figure 5B:
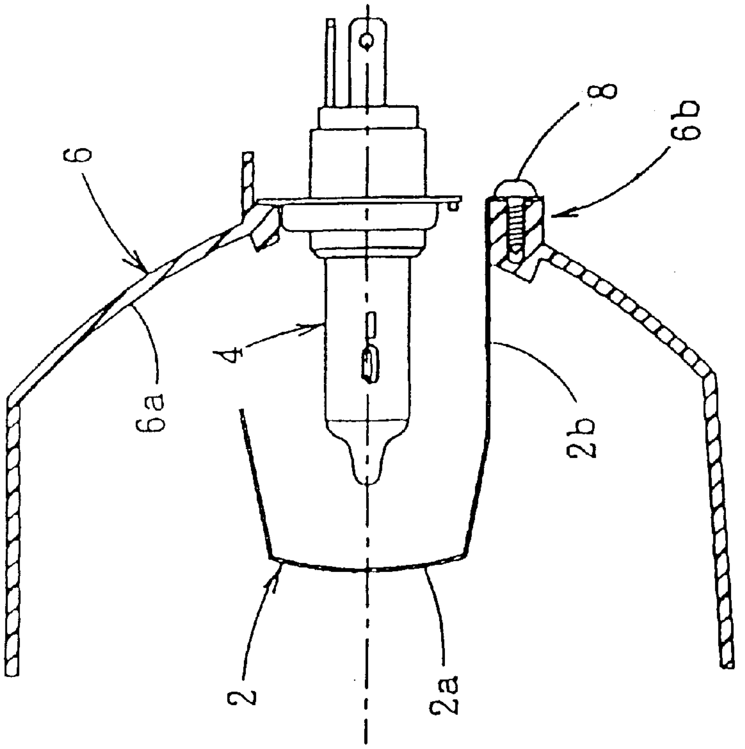
PRIOR ART FIG. 5B
FIGS. 5A and 5B are diagrams showing a conventional vehicle headlamp.
Figure 5A:
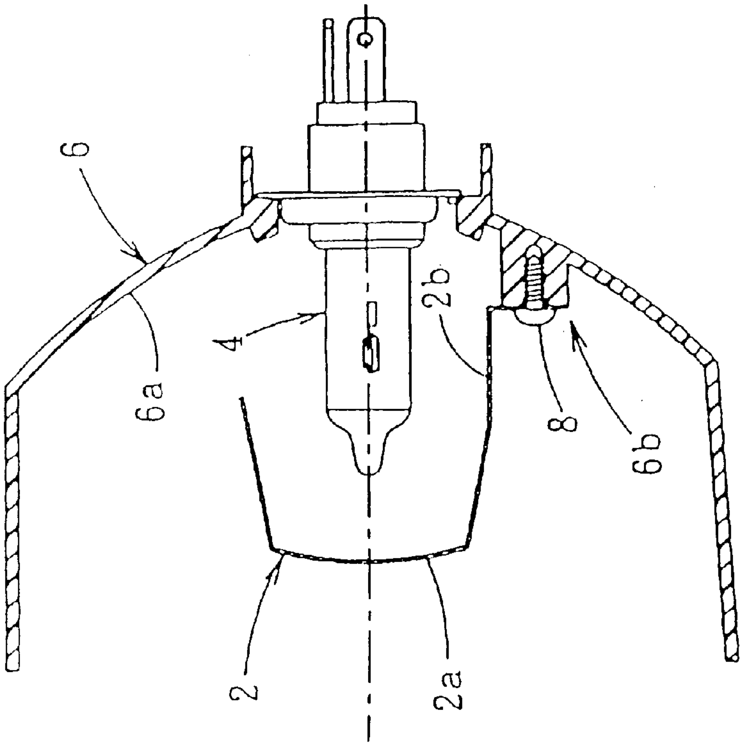
PRIOR ART FIG. 5A

FIG. 3 is a detailed drawing of the principal part of FIG. 1; FIG. 4A, a rear elevation of a single shade 22; and FIG. 4B, a rear elevation of the fitting-stay fixing portion 28 to which the shade 22 is fitted.

As shown in FIGS. 3 and 4, a fitting-stay inserting hole 20*e* is formed in the lower area of the reflective surface 20*a* of the reflector 20, and the fitting stay 26 is inserted through the fitting-stay inserting hole 20*e* from above.

A reflective region 20*a*1 positioned at the front of the fitting-stay fixing portion 28 fixed to the reflective surface 20*a* is so formed as to project forward relative to reflective regions 20*a*2 adjacent to the reflective region 20*a*1 in front of the fixed portion in the reflective surface 20*a*. Each of the reflective regions 20*a*1 in front of the fixed portion as seen from the front side of the lamp fixture is set substantially similar in shape (i.e., longer than is wide) to each of the segments of the reflective elements 20*s* forming the reflective region 20*a*2 adjacent to the reflective region 20*a*1.

The fitting stay 26 is fixed to the reflector 20 with a screw from behind.

More specifically, a boss 28*a* projecting backward is formed on the fitting-stay fixing portion 28, whereas a screw inserting hole 26*a* is formed in the fitting stay 26. By tightly fitting a screw 30 in the tapped hole 28*b* of the boss 28*a* via the screw inserting hole 26*a*, further, the fitting stay 26 is fixed to the reflector 20. A triangular rib 28*c* for reinforcing the boss 28*a* is formed in the lower end portion of the boss 28*a*. The triangular rib 28*c* is so formed as to extend in the vertical direction and also formed with a positioning pin 28*d* projecting backward on the right-hand side of the middle portion of the triangular rib.

A flange 26*b* is formed over the substantially whole length of both the lateral sides of the fitting stay 26, and a bead 26*c* is formed over a predetermined longitudinal length in a region near the shielding cap 24 in the laterally central portion of the fitting stay 26. The pair of flanges 26*b* and the bead 26*c* are designed to improve the rigidity of the fitting stay 26. Further, the curvature radius of a curvature portion 26*d* curving substantially perpendicularly at the fitting stay 26 is set at a value 0.5–2 times as large as the lateral width of the curvature portion 26*d*. It is thus intended to improve the rigidity of the fitting stay 26 further by setting the curvature radius of the curvature portion 26*d* larger.

The downwardly-directed leading end portion of the fitting stay 26 is formed in the shape of a hook whereby to form an erroneous installation preventive portion 26*e*.

More specifically, this erroneous installation preventive portion 26*e* is formed in such a way as to surround the positioning pin 28*d* in an arc of circle from the upper end of the positioning pin 28*d* up to the left end thereof. The positioning pin 28*d* and the erroneous installation preventive portion 26*e* are made laterally symmetrical with respect to the optical axis Ax between the lateral lamp fixtures. Supposing it is attempted to fit the shade 22 as the left-side (right-side) lamp fixture to the reflector 20 as the right-side (left-side) lamp fixture, the lower edge face of the erroneous installation preventive portion 26*e* is brought into contact with the positioning pin 28*d* so that the screw inserting hole 26*a* may not conform to the tapped hole 28*b* of the boss 28*a*. In consequence, the erroneous installation prevention is implemented by making it impossible to fit the screw into the hole.

As set forth above in detail, according to this embodiment, the structure of the fitting-stay fixing portion 28 is prevented from being seen when the lamp fixture is seen from its front side as the fitting-stay fixing portion 28 of the reflector 20 is provided at the back of the reflective surface 20*a*. According to this embodiment, moreover, the position of arranging the fitting-stay fixing portion 28 can be set close to the center of gravity of the shade 22 since the reflective region 20*a*1 positioned at the front of the fitting-stay fixing portion 28 of the reflective surface 20*a* is so formed as to project forward relative to reflective regions 20*a*2 adjacent to the reflective region 20*a*1 at the front of the fitting-stay fixing portion. Therefore, the moment of inertia of the shade 22 can be lowered by decreasing the length of the lever of the fitting stay 26, whereupon the vibration resistance strength can be sufficiently secured.

In the vehicle headlamp fitted with the shade according to this embodiment, the vibration resistance strength of the shade can thus be sufficiently secured on keeping the appearance of the lamp fixture from being deteriorated.

Although the reflective surface 20*a* of the reflector 20 is formed with the plurality of reflective elements 20*s* which are divided segments having a long and narrow rectangular shape in the vehicle headlamp 10 according to this embodiment, the lamp fixture as seen from its front side in the reflective region 20*a*1 at the front of the fixed portion of the reflective surface 20*a* is set substantially similar in shape to each of the segments of the reflective elements forming the reflective regions 20*a*2 adjacent thereto, whereby the reflective region 20*a*1 at the front of the fixing portion can be harmonized with the other regions of the reflective surface 20*a* in view of designing-making, so that the appearance of the lamp fixture as seen from its front side is improved.

According to this embodiment, moreover, in order to extend the fitting stay 26 up to the back side of the reflective surface 20*a*, the fitting stay 26 is bent into a substantially L-shape in that it is first extended downward after being extended backward from the shielding cap 24, and the fitting-stay inserting hole 20*c* for use in inserting the fitting stay 26 from above is formed in the reflector 20, whereby the fitting-stay fixing portion 28 can be provided in the most suitable position while the cutout area of the reflector 20 is minimized.

According to this embodiment, further, the flange 26*b* and the bead 26*c* are formed in the fitting stay 26, and the curvature radius of the curvature portion 26*d* is set at a value 0.5–2 times as large as the lateral width of the curvature portion 26*d* and this results in greatly increasing the rigidity of the fitting stay 26, whereby the vibration resistance strength of the shade 22 can be increased further.

As set forth above, according to this embodiment, since the external shape of the reflective surface 20*a* of the reflector 20 and that of the rear end edge 24*a* of the shielding cap 24 are not laterally symmetrical with respect to the optical axis Ax, it becomes necessary to fit the reflector for the left-side lamp fixture with the shade for the left-side lamp fixture and fit the reflector for the right-side lamp fixture with the shade for the right-side lamp fixture. According to this embodiment, however, formation of the erroneous installation preventive portion 26*e* in the leading end portion of the fitting stay 26 of the shade 22 prevents the reflector for the left-side (right-side) lamp fixture from being fitted with the shade for the right-side (left-side) lamp fixture; thus, the workability of installing the lamp fixture can be improved to that extent.

What is claimed is:

1. A vehicle headlamp comprising:

a light source bulb;

a reflector having a reflective surface for reflecting light forward from the light source bulb;

a shade for shielding the forwardly directed light from the light source bulb, the shade including a shielding cap and a fitting stay extending from the shielding cap and fixed to the reflector;

a fitting-stay fixing portion of the reflector provided at a back portion of the reflective surface and including a fitting stay inserting hole, wherein the fitting stay is inserted in a direction substantially perpendicular to the bulb's optical axis into the fitting stay inserting hole, wherein a reflective region positioned at a front portion of the fitting-stay fixing portion of the reflective surface is formed so as to project forward relative to reflective regions adjacent to the reflective region at the front of the fitting-stay fixing portion; and wherein said reflective surface comprises a plurality of reflective elements which are divided segments having predetermined shapes, in which the reflective region at the front of said fixing portion is substantially similar in shape to each of the segments of the reflective elements forming the reflective regions adjacent to the reflective region at the front of said fixing portion.

2. A vehicle headlamp as claimed in claim 1, said fitting stay further comprising a leading end portion adapted to prevent erroneous installation.

3. A vehicle headlamp as claimed in claim 1, wherein said fitting stay has two lateral sides, and flanges formed over the substantially whole length of both of the lateral sides.

4. A vehicle headlamp as claimed in claim 3, wherein said fitting stay has a bead formed over a predetermined longitudinal length in a region near said shielding cap in a laterally central portion of said fitting stay.

5. A vehicle headlamp as claimed in claim 1, wherein said fitting stay has a bead formed over a predetermined longitudinal length in a region near said shielding cap in a laterally central portion of said fitting stay.

6. A vehicle headlamp as claimed in claim 1, wherein said fitting stay has a lateral width, and a curvature radius at a portion curving substantially perpendicularly which is set at a value 0.5–2 times as large as the lateral width.

* * * * *